(12) United States Patent
Song et al.

(10) Patent No.: US 9,297,691 B2
(45) Date of Patent: Mar. 29, 2016

(54) DYNAMIC FIBER BRAGG GRATING INTERROGATION SYSTEM AND METHOD

(71) Applicants: Gangbing Song, Pearland, TX (US); Siu Chun Michael Ho, Sugar Land, TX (US); Ren Liang, Dailan (CN); Hongnan Li, Dailan (CN)

(72) Inventors: Gangbing Song, Pearland, TX (US); Siu Chun Michael Ho, Sugar Land, TX (US); Ren Liang, Dailan (CN); Hongnan Li, Dailan (CN)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 211 days.

(21) Appl. No.: 14/076,502

(22) Filed: Nov. 11, 2013

(65) Prior Publication Data

US 2014/0131562 A1   May 15, 2014

Related U.S. Application Data

(60) Provisional application No. 61/724,442, filed on Nov. 9, 2012.

(51) Int. Cl.
*G01J 1/04* (2006.01)
*G01H 9/00* (2006.01)
*G01D 5/353* (2006.01)

(52) U.S. Cl.
CPC ............ *G01H 9/004* (2013.01); *G01D 5/35316* (2013.01)

(58) Field of Classification Search
CPC ............ G01H 9/004; G05D 5/35338–5/35367
USPC ........................................ 250/227.18, 227.14
See application file for complete search history.

(56) References Cited

U.S. PATENT DOCUMENTS

| 4,996,419 | A * | 2/1991 | Morey ............... 250/227.18 |
| 6,990,295 | B2 | 1/2006 | Park |
| 7,319,707 | B2 | 1/2008 | Kim et al. |
| 2007/0183464 | A1 | 8/2007 | Poulsen et al. |
| 2011/0001981 | A1 | 1/2011 | Digonnet et al. |

FOREIGN PATENT DOCUMENTS

WO    WO 2012/103903    8/2012

OTHER PUBLICATIONS

Mihailov, Fiber Bragg Grating Sensors for Harsh Environments Sensors. Feb. 10, 2012, vol. 12 (Retrieved Mar. 14, 2014). Retrieved from internet <URL: http://www.ncbi.nlm.nih.gov/pmc/articles/PMC3304146/pdf/sensors-12-01898.pdf.pp. 1898-1918.

Betz et al. Fiberoptic Smart Sensing of Component Deformations in Adaptive Wings, ICAS 2000 Congress. [Retrieved Mar. 14, 2014]. Retrieved from internet: <URL: http://www.fbgs.com/referencesadv/bepen/1detail/item28/pages/1/navigationcats/14/.pp. 495.1-495-10.

(Continued)

*Primary Examiner* — Thanh Luu
(74) *Attorney, Agent, or Firm* — Winstead PC (57) ABSTRACT

A fiber Bragg grating (FBG) interrogation method allows for high frequency dynamic measurement. The method may utilize a broad band light source connected to the sensing elements. Each sensing element may comprise two wavelength matching FBGs, a coupler, and a photodiode. The FBG closest to the light source may attenuate the central wavelength in the transmission spectrum and thus the reflection spectrum of the second FBG. Variations in intensity of the second FBG may be measured by the photodiode and can be calibrated to the desired measurands.

22 Claims, 5 Drawing Sheets

(56) References Cited

OTHER PUBLICATIONS

Lau et al. Strain Monitoring in FRP Laminates and Concrete Beams Using FBG Sensors. Composite Structures 51.2001. [Retrieved Mar. 14, 2014]. Retrieved from internet <URL: http://www.sciencedirect.com/science/article/pii/S0263822300000945. pp. 9-20.

PCT International Search Report and Written Opinion for PCT/US2013/069404 dated Apr. 4, 2014.

* cited by examiner

DYNAMIC FIBER BRAGG GRATING INTERROGATION SYSTEM AND METHOD

RELATED APPLICATIONS

This application claims the benefit of U.S. Provisional Patent Application No. 61/724,442 to Song et al., filed on Nov. 9, 2012, which is incorporated herein by reference.

STATEMENT REGARDING SPONSORED RESEARCH

Not Applicable.

FIELD OF THE INVENTION

This invention relates to dynamic fiber Bragg grating (FBG) interrogation systems and methods. More particularly, to systems and methods for high frequency interrogation of FBGs.

BACKGROUND OF INVENTION

In designing and handling mechanical structures, one commonly encounters situations in which the measurement of high frequency vibrations plays an important role. Such high frequency measurements are valuable especially in the area of structural health monitoring. While fiber Bragg gratings (FBGs) have been well studied and understood for quasi-static strain and temperature measurements, their use for high frequency, dynamic measurements were impeded by sampling frequency limited optical spectrum analyzer components. Multiple intensity modulation-based methods have allowed high frequency interrogation of FBGs. The use of intensity modulation for the interrogation of FBGs involves the use of an optical filter that can adjust the intensity of incoming light based on the wavelength of the light. For example, some have designed a high rate FBG interrogator through the use of a fiber Fabry-Perot tunable filter. The filter uniquely converted wavelengths into a fixed level of intensity. Others have used an asymmetric FBG as an optical filter that preceded a single photodetector. The method was used to demonstrate measurement of signals up to 50 kHz. Another intensity based FBG interrogation method uses an arrayed waveguide grating (AWG). The AWG, which consists of an array of narrow-band optical filters, allow dense multiplexing of FBGs (theoretically up to 128 FBGs). Another method makes use of an extremely narrow band laser source and a regular FBG for the dynamic detection of high frequency events. By tuning the laser source at the spectral full width at half maximum (FWHM) of a highly apodized FBG, any wavelength shifts of the FBG will be translated to intensity fluctuations in the reflected spectrum. Such system demonstrated the measurement of ultrasonic vibrations. Others have performed high frequency FBG interrogation using a similarly narrow band laser source. The above methods are suitable for use in structural health monitoring, and are gaining popularity for use in cases where dynamic signals can point to structural damage. High frequency FBG interrogation methods utilizing similar principles as in the above were used to analyze the effects of impact on various structures, as well as for monitoring of structural changes over time (e.g. delamination).

The intensity modulation methods described above require the use of special filters or laser sources. A separate class of such methods exists in which regular FBGs can be used as the filter, thus potentially driving down costs and simplifying the system. For instance, some have proposed similar set ups in which the signals of a sensing FBG could be measured without the use of additional filtering or interrogation techniques. In such methods, the reflection spectrum of two wavelength matched FBGs are compared by a photodiode. The more overlap there is between the center wavelengths of the two FBGs correlate, the higher the amount of power received by the photodiode. If the FBGs are placed adjacent to each other at close proximity, the effects of thermally induced strain can be minimized. These wavelength-matched methods utilize dual FBGs per sensor to free the user from the cost and sampling frequency related limitations of specialized components, such as scanning optical filters, but may need additional equipment for multiplexing (e.g. switches).

In the following dynamic FBG interrogation system and method, a wavelength matched set up using regular FBGs is described that is also able to measure dynamic signals such as acoustic vibrations. The dynamic FBG interrogation system and method utilizes the transmission spectrum of one FBG and the reflection spectrum of the other. The benefit of this approach is the inclusion of fewer optical couplers, which can be a source of optical power loss in other systems, and as will be seen can thus increase the sensing range of the system.

SUMMARY OF THE INVENTION

A fiber Bragg grating (FBG) interrogation system and method allows for high frequency dynamic measurement. The method may utilize a broad band light source connected to the sensing elements. Each sensing element may comprise two wavelength matching FBGs, a coupler, and a photodiode. The FBG closest to the light source may attenuate the central wavelength in the transmission spectrum and thus the reflection spectrum of the second FBG. Variations in intensity of the second FBG may be measured by the photodiode and can be calibrated to the desired measurands. The FBG interrogation system measures high frequency vibrations that are useful for structural health monitoring.

In some embodiments, a fiber Bragg grating (FBG) interrogation system, the system comprises a broad band spectrum (BBS) light source, and a first FBG receiving an optic signal from the light source, wherein the first FBG filters the optic signal and transmits a transmitted signal. The FBG interrogation system may further provide a second FBG receiving the transmitted signal from the first FBG, wherein the second FBG reflects a central wavelength to produce a reflected signal, and an optical coupler coupled to the first and second FBG, wherein the optical coupler receives the transmitted signal and the reflected signal and provides an output signal. A photodetector coupled to the optical coupler receives the output signal, wherein the photodetector detects a minimum amount of energy when the transmitted signal and the reflected signal are wavelength matched and increased energy when the transmitted signal and the reflected signal are mismatched.

In some embodiments, a method for sensing vibrations with a fiber Bragg grating (FBG) interrogator comprises the steps of providing an optic signal from a light source, wherein the light source is a broad band spectrum (BBS) source. The optic signal from the light source is received at a first FBG, wherein the first FBG filters the optic signal and transmits a transmitted signal. The transmitted signal from the first FBG is received at a second FBG, wherein the second FBG reflects a central wavelength to produce a reflected signal. The transmitted signal from the first FBG and the reflected signal from the second FBG received by an optical coupler that outputs an output signal. The output signal from the optical coupler is monitored with a photodetector. The photodetector detects a minimum amount of energy when the first transmitted signal and the reflected signal are wavelength matched, thereby indicating little to no vibration is present. When the first transmitted signal and the reflected signal are mismatched, the photodetector detects an increase in energy that indicates vibration is present.

The foregoing has outlined rather broadly various features of the present disclosure in order that the detailed description that follows may be better understood. Additional features and advantages of the disclosure will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Refer now to the drawings wherein depicted elements are not necessarily shown to scale and wherein like or similar elements are designated by the same reference numeral through the several views.

Referring to the drawings in general, it will be understood that the illustrations are for the purpose of describing particular implementations of the disclosure and are not intended to be limiting thereto. While most of the terms used herein will be recognizable to those of ordinary skill in the art, it should be understood that when not explicitly defined, terms should be interpreted as adopting a meaning presently accepted by those of ordinary skill in the art.

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

A fiber Bragg grating (FBG) sensor system and method may provide measurements of high frequency, dynamic signals. These systems and methods may allow vibration to be measured for structural health monitoring. In an exemplary embodiment, a FBG system may provide a broad band spectrum (BBS) light source, at least one pair of wavelength matched FBGs, an optical coupler, and photodetector. The BBS light source may provide an optic signal to the first FBG that transmits to the optical coupler. The coupler may be coupled to the second FBG and the photodetector. The transmitted signal from the first FBG and reflected signal from the second FBG are provided to the coupler, and the resulting signal from the coupler is received by the photodetector.

In some embodiments, the FBG interrogation systems and methods allow for measurement of high frequency vibrations that is desirable for various structures. As nonlimiting examples, the FBG systems and methods may be utilized to measure vibrations in cantilever-like structures, such as airplane wings or wind turbine blades. The FBG systems and methods may be used to monitor pipelines for third intrusions or the like. For example, the FBG system may be positioned on or in an airplane wing, a turbine blade, pipeline, concrete structure, or the like. Further, the FBG systems and methods may be used for structural health monitoring of structures, such as concrete structures, bridges, roadways, buildings, or the like.

In some embodiments, the FBG interrogation systems and methods is capable of measure high frequency vibrations of 100 kHz or less. In some embodiments, the FBG interrogation systems and methods is capable of measure high frequency vibrations of 1 GHz or less. The minimum frequency may be dependent on the photodetector utilized. In some embodiments, the FBG interrogation systems and methods is capable of measure high frequency vibrations equal to or between 0.1 Hz to 1 GHz.

Figure 1:
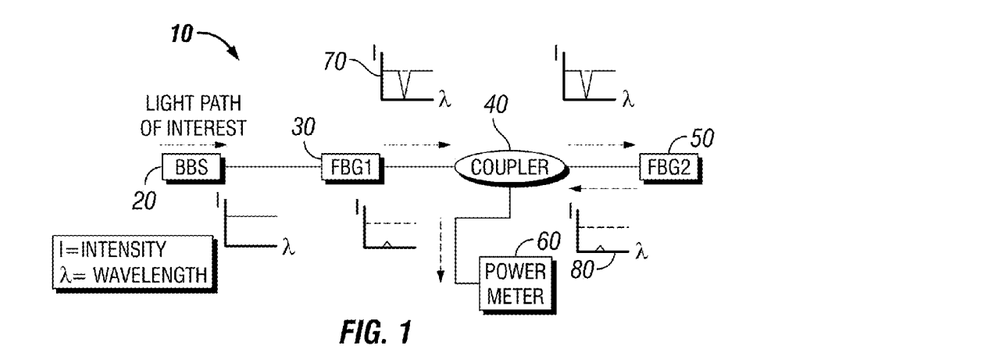
FIG. 1 is an illustrative embodiment of an optical circuit of a wavelength-matched dynamic FBG sensing system.

FIG. 1 is an illustrative embodiment of a FBG interrogation system 10. The proposed dynamic FBG interrogation systems and methods discussed herein take advantage of the power fluctuations due to the intersection of the reflection and transmission spectrums of two FBGs. A broad band spectrum (BBS) light source 20, such as a laser, is injected into an optical circuit containing two wavelength matching FBGs 30, 50, an optical coupler 40, and a photodetector 60 (e.g. optical power meter or photodiode).

The first FBG 30 filters out most of the optical power in the incident spectrum by the transmitted signal 70. The transmitted portion of the spectrum crosses the coupler 40 to reach the second FBG 50. At this point, any remaining energy correlated with the FBG's central wavelength will be reflected back as shown by the reflected signal 80 towards the light source 20 and photodetector 60. By attenuating a central wavelength in the transmission spectrum, the first FBG 30 thus attenuates the reflection spectrum of the second FBG 50. If the two FBGs 30, 50 are exactly wavelength matched, a minimum amount of energy will be detected by the photodetector 60. Any mismatch between the central wavelengths of the two FBGs 30, 50 will cause in increase in energy until the reflection spectrum of the FBGs no longer overlap. The mismatch may be caused by the measurand, such as vibrations. Once the reflection spectrum no longer overlaps, the reading from the power meter will appear saturated.

Calculation of Spectral Width

The intensity of the vibrations determines how far the reflection spectrums of the two FBGs move relative to each other. As discussed before, saturation occurs when the vibration intensity moves the reflection spectrums out of the overlapping region. The following is an examination of the spectral width and potential optimization methods.

The spectrum of the BBS may be approximated by Equation 1

$$S(\lambda) = I\exp\left(-4(\ln 2)\left(\frac{\lambda - \lambda_0}{\Delta\lambda_0}\right)^2\right) \quad \text{Equation 1}$$

Where $\Delta\lambda_0$ is the (full width at half maximum) FWHM of the BBS, $\lambda_0$ is the center wavelength, and I is the peak power. I is defined by $$I = \frac{P_0}{\Delta\lambda_0}\left(4\ln\left(\frac{2}{\pi}\right)\right)^{\frac{1}{2}} \quad \text{Equation 2}$$

Where $P_0$ is the total power injected into the system from the BBS. The ideal BBS should be smooth and flat in the operating region of the FBG.

The reflectivity of a simple FBG can be described by $$P = \frac{\kappa^2 \sinh^2(\alpha L)}{\kappa^2 \cosh^2(\alpha L) - \hat{\zeta}^2} \quad \text{Equation 3}$$

Figure 2:
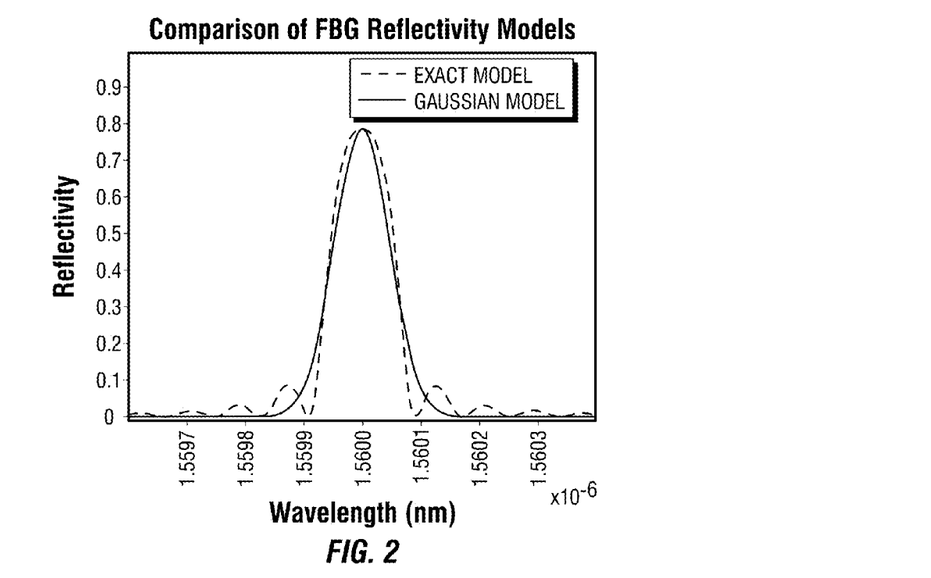
FIG. 2 is an illustrative embodiment of comparison of FBG reflectivity models.

The use of Equation 3 involves the use of many parameters, and can be cumbersome to use. However, an alternative equation can be used instead of Equation 3 for the convenience of modeling. The reflectivity of the FBG (indexed by i) can be alternatively described as a Gaussian distribution (Equation 4)

$$D_i(\lambda)A_i\exp\left(-4(\ln 2)\left(\frac{\lambda - \lambda_{Bi}}{\Delta\lambda_{Bi}}\right)^2\right), \quad \text{Equation 4}$$

Where $D_i(\lambda)$ is the Gaussian approximation of the FBG reflectivity, $A_i$ is the maximum reflectivity of the FBG, $\lambda_{Bi}$ is the center wavelength of the FBG, and $\Delta\lambda_{Bi}$ is the FWHM of the FBG. For the purposes of this experiment, the FBG closest to the BBS is indexed by i=1, and the matching FBG is indexed by i=2. FIG. 2 compares the exact model and the Gaussian model of the FBG reflectivity.

Consequently, the reflection spectrum $T(\lambda)$ of FBG1 due to the input of the BBS is $$E_1(\lambda) = S(\lambda_B) D_1(\lambda), \quad \text{Equation 5}$$

Where $\lambda_B$ is the center wavelength of the wavelength-matched FBGs and $S(\lambda_B)$ gives the amplitude of the lamb in the spectrum of the BBS. The transmission spectrum of the first FBG is $$T(\lambda) = S(\lambda_B)(1 - D_1(\lambda)) \quad \text{Equation 6}$$

Thus, the spectral distribution received by the photodetector is $$E_2(\lambda) = T(\lambda) D_2(\lambda) \quad \text{Equation 7}$$

Figure 3:
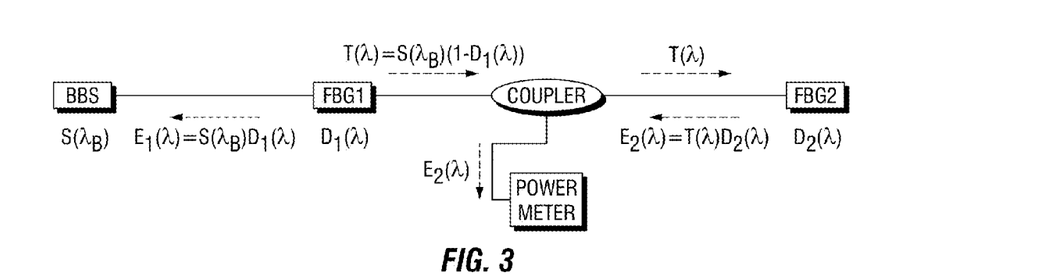
FIG. 3 is an illustrative embodiment tracing of the optical power along the optical circuit.

The energy profile of the optical path is traced in FIG. 3.

Figure 4:
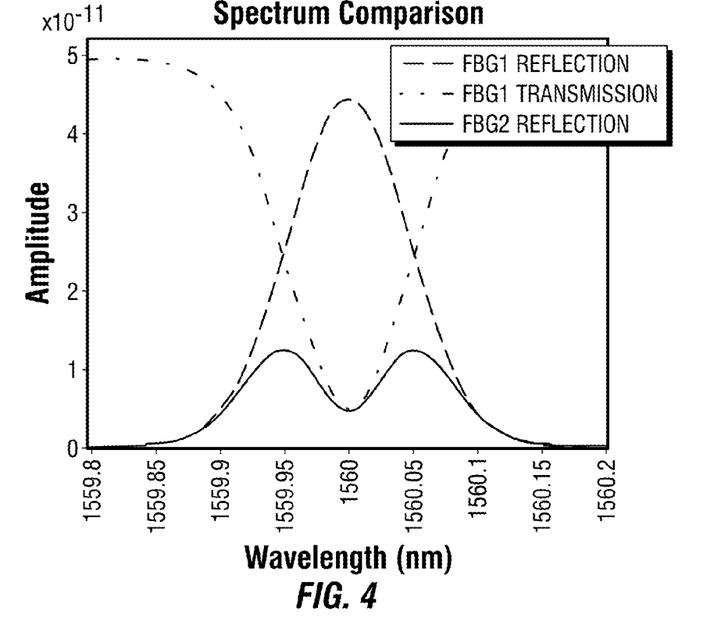
FIG. 4 is an illustrative embodiment comparing the relevant spectrums of FBG1 and FBG2.

The reflection ($E_1$) and transmission (T) spectrums of FBG1 and the reflection spectrum ($E_2$) of FBG2 (the spectrum seen by the photodetector) is shown is FIG. 4, as calculated by Equations 1-6 assuming $A_{1,2}$=90% and $\lambda_{B1,B2}$=1560 nm.

The total power received by the photodetector is $$W = k^2(1-k)^2 \int_{-\infty}^{\infty} T(\lambda) D_2(\lambda) d\lambda, \quad \text{Equation 8}$$

$$W = k^2(1-k)^2 S(\lambda_B) \int_{-\infty}^{\infty} D_2(\lambda) - D_1(\lambda) D_2(\lambda) d\lambda, \quad \text{Equation 9}$$

$$W = k^2(1-k)^2 S(\lambda_B) \int_{-\infty}^{\infty} A_2 \exp\left(-4(\ln 2)\left(\frac{\lambda - \lambda_{B2}}{\Delta\lambda_{B2}}\right)^2\right) - \quad \text{Equation 10}$$
$$A_1 A_2 \exp\left(-4(\ln 2)\left(\frac{\lambda - \lambda_{B1}}{\Delta\lambda_{B1}}\right)^2 - \left(\frac{\lambda - \lambda_{B2}}{\Delta\lambda_{B2}}\right)^2\right) d\lambda$$

Using the relationship $$\int_{-\infty}^{\infty} A\exp(-ax^2 + bx + c) dx = A\sqrt{\frac{\pi}{a}} \exp\left(\frac{b^2}{4a} + c\right), \quad \text{Equation 11}$$

and assuming $\Delta\lambda_{B1} = \Delta\lambda_{B2}$ (both FBGs have the same FWHM), the following expression can be obtained $$W = k^2(1-k)^2 P_0 A_2 \beta(\lambda_{B1}) \frac{\Delta\lambda_B}{\Delta\lambda_0}\left(1 - \frac{A_1 \alpha(\lambda_{B1})\sqrt{2}}{2}\right), \quad \text{Equation 12}$$

where $$\alpha(\lambda_{B1}) = \exp\left(-2(\ln 2)\left(\frac{\lambda_{B1} - \lambda_{B2}}{\Delta\lambda_{B2}}\right)^2\right), \quad \text{Equation 13}$$

and $$\beta(\lambda_{B1}) = \exp\left(-4(\ln 2)\left(\frac{\lambda_{B1} - \lambda_0}{\Delta\lambda_0}\right)^2\right). \quad \text{Equation 14}$$

Figure 5:
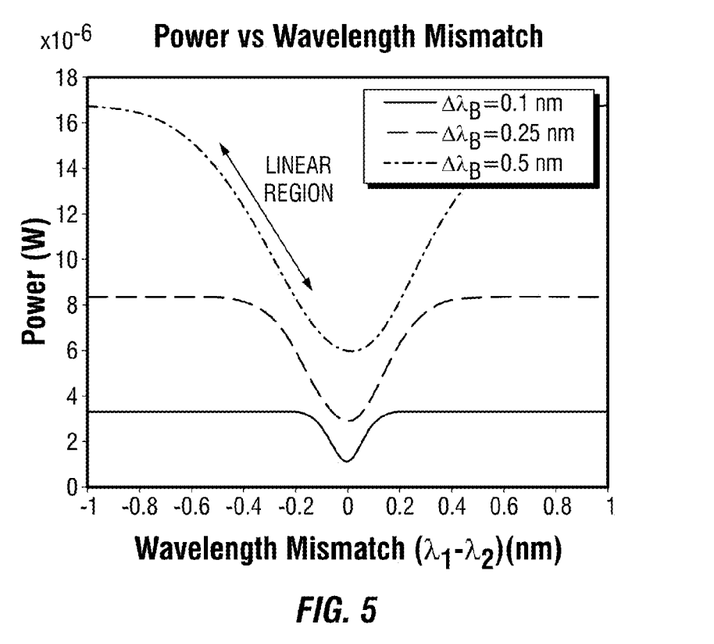
FIG. 5 is an illustrative embodiment of photodetector power v. wavelength mismatch between FBG1 and FBG2.

From equations 12 to 14, it can be seen that the minimum optical power occurs when the center wavelengths of FBG1 and FBG2 overlap exactly (FIG. 5). Different FBG FWHMs are plotted simultaneously in FIG. 4, and from comparison shows that a higher FWHM produces a larger range before saturation occurs. The specification of the FBG FWHM is established during the FBG fabrication stage. There are various types of FBGs that have unique reflectivity profiles that effectively expand the FWHM. For example, chirped FBGs have much wider spectral widths than type 1 FBGs.

On the other hand, a consideration of the power versus wavelength mismatch in FIG. 5 reveals that in order for signals to have a unique power output for a certain amount of strain, the wavelength mismatch must remain within either half of the power profile. The power profile is a range during which the power output for a FBG changes with the wavelength mismatch. As can be seen in FIG. 5, the power profile is approximately ±0.17 nm, ±0.4 nm, and ±0.8 nm for FBG with different $\Delta\lambda_B$. As will be seen in the simulation and results, an overly large strain input will cause the wavelength mismatch to produce saturated or non-unique power outputs from the photodetector. Optimally, one FBG should be carefully tuned so that the initial or resting wavelength mismatch is in the center of one of the two slopes containing the power profile. For example, if the width of the power profile is ±0.4 nm, the linear regions will approximately be between −0.38 to −0.02 nm and +0.02 to +0.38 nm (in terms of wavelength mismatch), and the initial wavelength mismatch should be tuned to either −0.20 nm or +0.20 nm to maximize the amount of linearity in the sensor system response in either direction.

Any strain on either FBG1 or FBG2 will cause a deviation between their center wavelengths and thus an increase in the optical power received at the photodiode. For a sensor system with parameters k=0.5, $A_{1,2}$=0.9, $\Delta\lambda_B$=0.1 nm, $P_0$=0.0501 W (17 dbm), and $\Delta\lambda_0$=80 nm (lowest profile shown in FIG. 5), the full spectral width of the power profile is about ±0.17 nm, corresponding to a detection of ±141.67µε, according to an assumed bare FBG strain sensitivity of 1.2 pm/µε. Strains outside the range will cause a saturation of the optical power.

The following examples are included to demonstrate particular aspects of the present disclosure. It should be appreciated by those of ordinary skill in the art that the methods described in the examples that follow merely represent illustrative embodiments of the disclosure. Those of ordinary skill in the art should, in light of the present disclosure, appreciate that many changes can be made in the specific embodiments described and still obtain a like or similar result without departing from the spirit and scope of the present disclosure.

Experimental Setup

Figure 6:
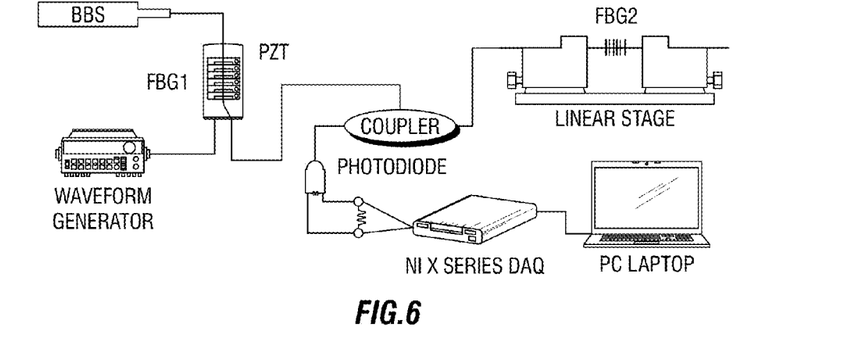
FIG. 6 is an illustrative embodiment of a set up for Experiment 1.
Figure 7:
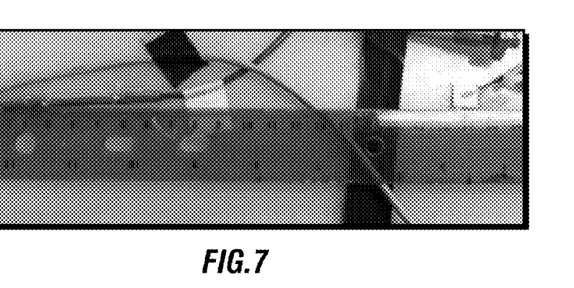
FIG. 7 shows the relative location between the FBG and the PZT patch.

Two experiments were performed using the setup shown FIGS. 6 and 7. The first experiment had one FBG sensor directly bonded to a PZT actuator, and the second experiment had one FBG sensor bonded to a medium at a distance away from a PZT actuator. In both experiments, FBGs with at least 90% reflectivity were used. Connection between the FBGs and the photodiode was allowed using a 3 dB optical coupler. The FBGs had approximately 0.15 nm mismatch.

Experiment 1

FBG Sensor Directly Bonded to PZT Actuator

Two Type I FBGs with matching wavelengths at 1560 nm were used in the experimental setup as shown in FIG. 6. One of the FBGs (FBG1) was bonded via cyanoacrylate onto a 2.5"×1" PZT wafer while the other (FBG2) was mounted on an adjustable linear stage. A waveform generator (Agilent 33120A) was used to drive the PZT wafer. The FBGs were illuminated using a broad band source (BBS) (ASE laser in the C band), and the power level at the overlapping wavelength was measured by a PIN photodiode (InGaAs, ETX 75HB). The voltage across a parallel resistor (51.1 kOhms) was recorded by an NI board (X series, PCIe/PXIe/USB-6361).

A sweep sine from 0 to 100 kHz over 4 seconds at 10 V was input into the PZT in order to examine the frequency response of the system. The sampling rate was set at 500 kHz.

Experiment 2

FBG Sensor Bonded at a Distance Away from PZT Actuator

In the second experiment, an FBG strain sensor with a sensitivity of 2.2 pm/µε was bonded via cyanoacrylate to a model wind turbine blade while another FBG with a matching wavelength at 1568 nm was mounted on a linear stage for precise wavelength adjustment (FIG. 7). In regards to FIG. 6, the setup of Experiment 2 is the same as Experiment 1 except that the PZT wafer is replaced with the wind turbine blade. Additionally, a 1 cm×1 cm piezoelectric patch was bonded using epoxy about 9 cm away from the FBG strain sensor.

A sweep sine from 0 to 100 kHz over 4 seconds at 10 V was input into the PZT in order to examine the frequency response of the system. The sampling rate was set at 500 kHz. In order to examine the impulse response of the turbine blade, an impulse was input at the middle of the wind turbine blade. To better capture transient responses, the impact test was sampled at 1 MHz for 12 seconds.

Using a PZT patch (same as the PZT patch used in the sweep sine test), the impact test was repeated in order to serve as a comparison to the FBG sensor system.

For both experiments, the reflection spectrum of all FBGs were uniform, and were not affected by the bonding conditions.

Simulation

Using equations 12-14, the response of the FBG sensor system was simulated in MATLAB/Simulink. The data acquired from the previous impact tests were used to construct a second order transfer function describing the wind turbine blade. The parameters used for simulation were parameters k=0.5, $A_{1,2}$=0.9, $\Delta\lambda_B$=0.2 nm, $P_0$=0.0501 W (17 dbm), and $\Delta\lambda_0$=80 nm.

Results

Experiment 1

FBG Sensor Directly Bonded to PZT Actuator

Figure 8A:
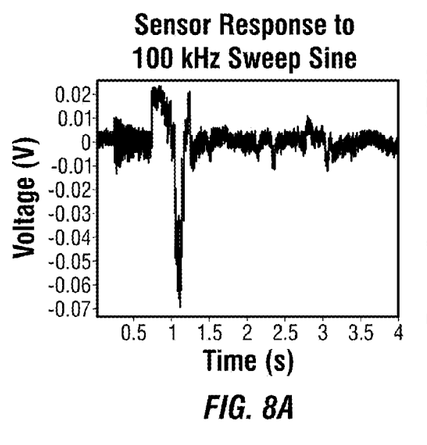
FIGS. 8A-8B show (Left) time domain response of the FBG sensor to a sweep sine excitation, and (Right) power spectral density of the sweep sine response.
Figure 8B:
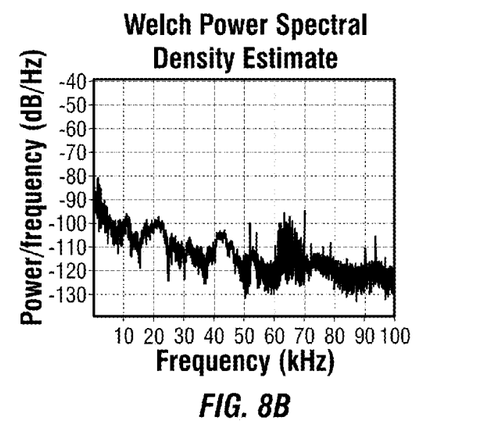

FIGS. 8A-8B respectively show a time domain response of the FBG sensor to a sweep sine excitation, and a power spectral density of the sweep sine response. The sweep sine excitation caused a change in the DC component of the signal at many parts of the excitation. The response of the sensor system reached a maximum of about −0.7 V. This peak corresponded to the 18-23 kHz region in the frequency spectrum, which had a relatively raised power density. It was observed that violent shaking of the PZT wafer occurred during this frequency range. The rest of the sensor response was less eventful, with a few noticeable peaks in the 40 and 60 kHz ranges.

Experiment 2

FBG Sensor Bonded at a Distance Away from PZT Actuator

Sweep Sine Test

Figure 9A:
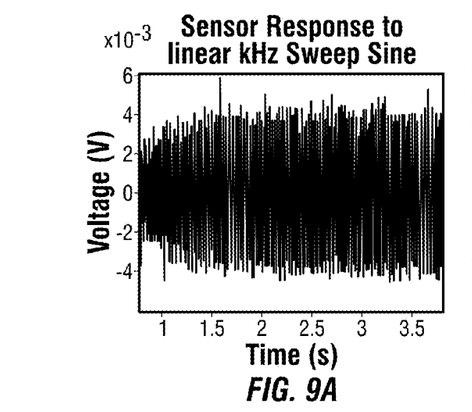
FIGS. 9A-9B show (Left) initial portion of the sweep sine result, and (Right) power spectral density of sweep sine response.
Figure 9B:
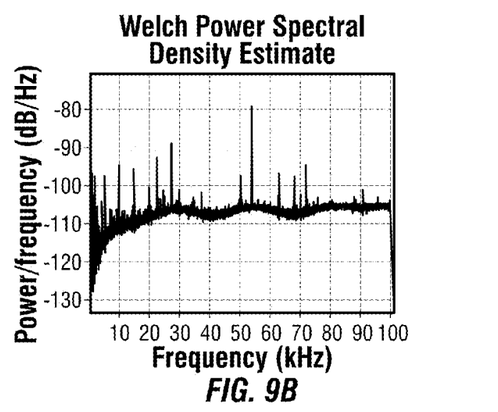
Figure 10A:
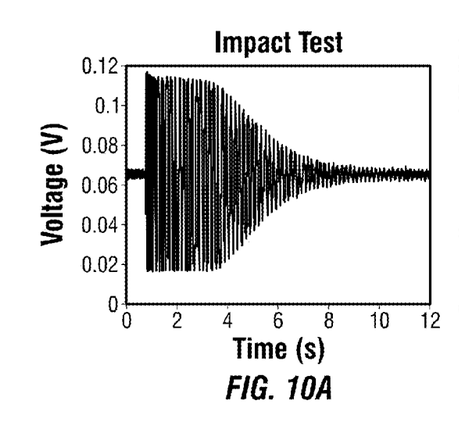
FIGS. 10A-10B show (Left) impulse response of the turbine blade as sensed by the FBG sensor system, and (Right) dominant natural frequencies of the turbine blade as measured by the FBG sensor system.
Figure 10B:
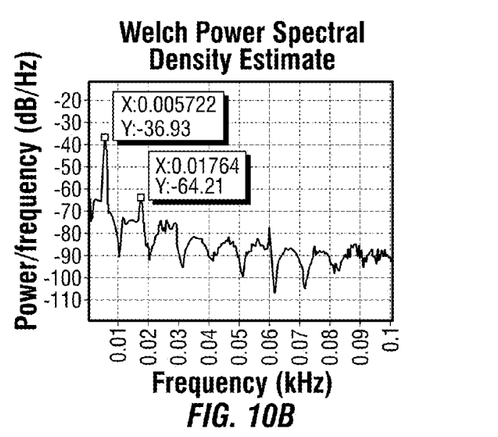

FIGS. 9A-9B respectively show an initial portion of the sweep sine results, and power spectral density of sweep sine results. The readings of the FBG system indicate the ability to sense the acoustic vibrations of the PZT despite the distance and the steel strain gauge housing. The frequency response across the excitation region was quite stable with minor fluctuation seen after 70 kHz. A multitude of frequency peaks are seen for the lower range of frequencies (<10 kHz). Another noteworthy characteristic of the sweep sine response is a large peak at the 54 kHz frequency is seen in the power spectrum Impact Test During the impact test, the fundamental modes of the turbine blade were excited (the first two modes were measured at 5.72 Hz and 17.6 Hz) (FIGS. 10A-10B). In order to avoid artifacts created by saturation nonlinear effects, only the signals obtained from the linear region was used for frequency analysis. The turbine blade settled around 10 seconds after impact. During the initial 1.5 seconds, a small amount of saturation was observed (upper bound was 0.115 V, and the lower bound was −0.02 V) along with the nonlinear effects of entering the other lobe of the power profile (see FIG. 4) before the vibrations gradually attenuated.

Figure 11A:
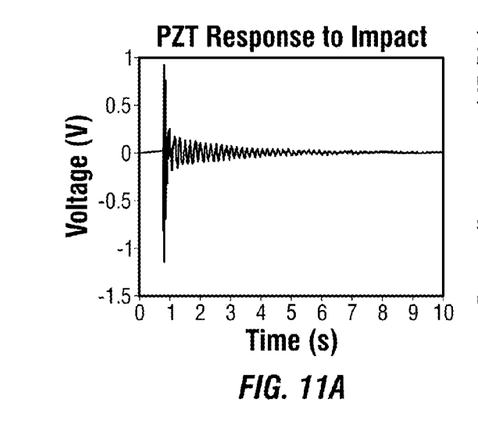
FIGS. 11A-11B show (Left) impulse response of the turbine blade as sensed by the PZT patch, and (Right) natural frequencies of the turbine blade as measured by the PZT patch.
Figure 11B:
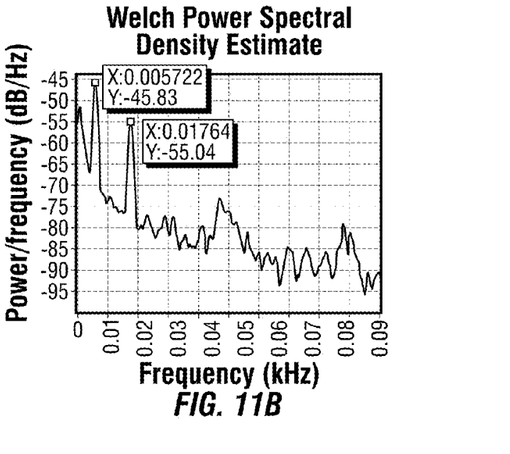

Apart from the absence of saturation due to the wider sensing range (~−1.1 V to 0.9 V) of the PZT patch, the other signal behaviors were similar with the FBG sensor system (FIGS. 11A-11B). The modes sensed by the PZT patch were identical to the modes sensed by the FBG sensor system (5.72 Hz and 17.64 Hz), thus verifying the results obtained from the FBG sensor system.

Simulation Results

Figure 12A:
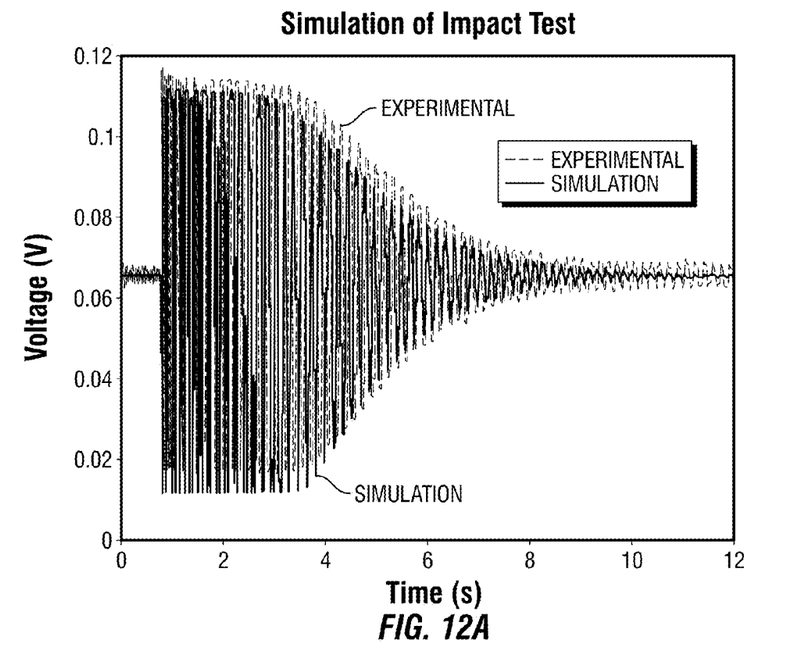
FIGS. 12A-12B show (Left) a comparison of experimental and simulation result, and (Right) a zoom in of the data.
Figure 12B:
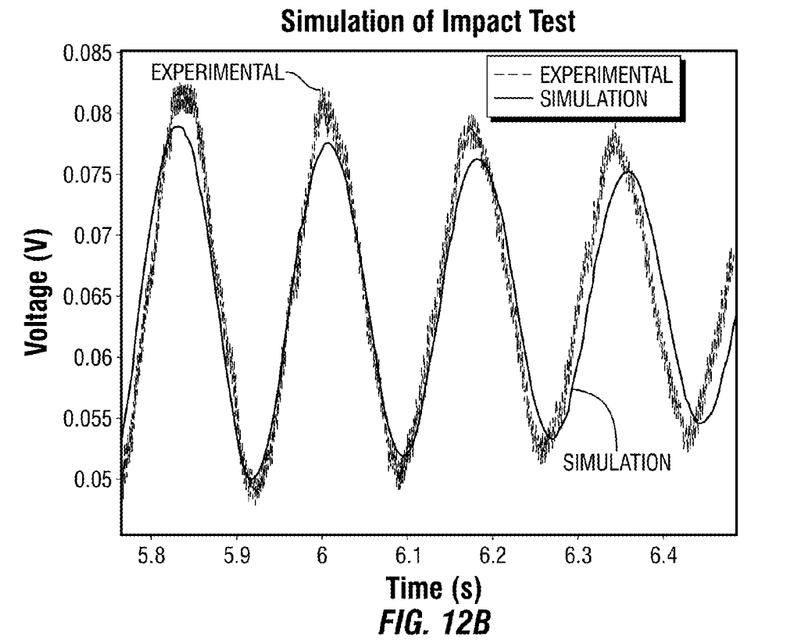

Based on the impact test results, a second order approximation of the transfer function (TF(s)) with respect to strain of the sensor on the wind turbine blade is $$TF(s) = \frac{\omega_n^2}{s^2 + 2\zeta\omega_n + \omega_n^2} = \frac{1288}{s^2 + 1.27 + 1288}, \quad \text{Equation 15}$$

where the dominant natural frequency was 5.72 Hz (35.9 rad/s) and the damping ratio according to the log decrement method was 0.0178. The output of the transfer function was used as the strain input to the FBG sensor system model. FIGS. 12A-12B show a comparison of experimental and simulation result, and a zoom in of the comparison. The overall shape and the signal behavior closely matched that of the experimental impact test result. Differences include an approximately 0.01 V bias in the vibrating portion of the signal (i.e. the resting voltage was matched by introducing a bias in simulation, but the experimental results is weighted more positively). The bias was most severe in the beginning, but began to decrease as both simulation and experimental signals converged towards the resting voltage of 0.65 V. A closer inspection of the vibrations reveals a phase variation of the experimental data with respect to the simulation (FIG. 12B).

Discussion

The experiment discussed verifies that a FBG-based sensor system is able to measure dynamic signals without the use of expensive and sometimes bulky components such as optical scanners, spectrum analyzers, etc. Several tests were performed to demonstrate the ability of the sensor system to measure dynamic signals. As seen in the results, the sensor system was able to measure high frequency vibrations through the vibration induced optical power fluctuations observed by the photodetector.

In the first experiment, FBG1 was directly bonded to the PZT wafer. Unlike the corresponding portion of the second experiment, the sweep sine inputted into the PZT wafer did not produce a completely sine wave output from the sensor system, and instead introduced a bias at certain frequencies (18-23 kHz). The appearance of the bias suggests an uneven bondage of the FBG on the PZT wafer or an uneven contraction of the PZT wafer along the bonded length of the FBG (i.e. the additional stiffness provided by the cyanoacrylate and the FBG on one side may have caused the contractions to favor one side over the other). On the other hand, since the FBG was directly bonded to the PZT wafer, the signals received were stronger than the signals in the second experiment.

Unlike the first experiment, in the second experimental set up the sensing FBG and the vibration sources were not only farther apart (9 cm), but were separated by different layers of material (surface, bonding agent, steel casing, etc.). During the second sweep sine test, the voltage measured from the resistor was one order magnitude smaller than what was observed in the first sweep sine test. However, the output shape and frequency response of the FBG system matched the sweep sine input transmitted by the PZT patch much more closely. The ability of the sensor system to measure such vibrations despite environmentally induced dampening effects (e.g. distance, material mismatch, etc.) implies the sensor system is suitable for structural health monitoring. Furthermore, interchangeability of system components grants the system mobility and adaptability, which are advantageous for field deployment. As such, any FBG sensor, even those already installed or embedded in the field, can be converted into a similar dynamic sensor system. For example, smart aggregates may be used to perform the health monitoring of various concrete structures, and a concurrently installed FBG sensing system may be used as a complementary acoustic wave sensor by selecting one of the FBGs and applying a set-up as discussed herein. The range of strain levels readable by the FBG sensing system is limited compared to the inherent strain sensing ability of the FBG sensors themselves (>4000µε).

As seen in FIG. 10A, some saturation can be seen at the beginning of the vibrations, where the amplitude of the vibrations did not exceed 0.02 and 0.11 V for the first 1.8 seconds after impact. In this scenario, the strain of the FBG caused enough of a wavelength mismatch that the power levels received at the photodiode swept between the two lobes of the profile as well as progressing into the flat regions seen in FIG. 5. Noted in the results section were some differences between experimental and simulation results. These differences included a bias present during vibration and a phase variation in the experimental data. Factors that may account for the differences may arise from several areas. First, the Gaussian model utilized in the modeling is a simplification and idealization of the more complex FBG reflectivity profile. The actual FBG reflectivity profile may have imperfections due to manufacturing and installation conditions (e.g. profiles may be skewed, incompletely apodized, split, etc). Secondly, the transfer function of the turbine blade did not include the higher order dynamics than the turbine blade. Thus, the simulation would not have predicted the transient effects of higher order excitation that may have contributed to the phase variation.

On the other hand, by taking the power density spectrum of the linear portion of the signal, the dominant natural frequencies of the turbine blade could be discerned. A frequency analysis of the PZT response confirmed the measurements of the FBG sensor system.

The total cost of this system significantly lower than other interrogation systems. This systems cost may range from $1000-5000, whereas other commercially available system are usually in the tens of thousands of dollars. For example current cost of this system, not including the DAQ, the mount, and the computer, is estimated to be less than $3000 (including laser source, power supply, two FBGs, one coupler, and one photodiode). FBG wavelength interrogation schemes that employ special optical filters can raise the additional expenses about $1000-$2000. For commercially available interrogation packages, the costs may go up to $10,000 per channel.

Future development of this FBG sensor system points toward the construction of a highly portable unit that can be adapted to existing FBG sensor installations. The FBG sensor system has the capability of being multiplexed. Multiplexing can be accomplished by repeating the set-up in series after FBG2. The main concern with multiplexing in this system is the attenuation of the optical power emitted from the laser source, the use of additional photodiodes, and the requirement for matching FBG center wavelengths. However, the use of low-attenuation coupling components (e.g. optical circulators) and high frequency electrical switches (for sampling between photodiodes using minimal DAQ channels) may help to mitigate such obstacles.

CONCLUSIONS

A new method for using wavelength matched FBGs in dynamic sensing is presented. The investigation of this new sensor system revealed that to maximize the range in which wavelength mismatch linearly correlates to photodiode power levels the system should operate in the FWHM of the FBGs and an optimal initial wavelength mismatch. Subsequently, experimental results verified the ability the system in measuring high frequency vibrations (up 100 kHz was measured).

Implementations described herein are included to demonstrate particular aspects of the present disclosure. It should be appreciated by those of skill in the art that the implementations described herein merely represent exemplary implementation of the disclosure. Those of ordinary skill in the art should, in light of the present disclosure, appreciate that many changes can be made in the specific implementations described and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. The implementations described hereinabove are meant to be illustrative only and should not be taken as limiting of the scope of the disclosure.

What is claimed is:

1. A fiber Bragg grating (FBG) interrogation system, the system comprising:
   a broad band spectrum (BBS) light source;
   a first FBG receiving an optic signal from the light source, wherein the first FBG filters the optic signal and transmits a transmitted signal, and the transmitted signal has a first central wavelength in a resting state;
   a second FBG receiving the transmitted signal from the first FBG, wherein the second FBG reflects a second central wavelength to produce a reflected signal, and the second central wavelength of the reflected signal matches the first central wavelength when the second FBG is in the resting state;
   an optical coupler coupled to the first and second FBG, wherein the optical coupler receives the transmitted signal and the reflected signal and provides an output signal; and
   a photodetector coupled to the optical coupler to receive the output signal, wherein the photodetector detects a minimum amount of energy when the first central wavelength of the transmitted signal and the second central wavelength of the reflected signal match, thereby indicating vibration is absent, and
   wherein further the photodetector detects an increased energy when the first central wavelength of the transmitted signal and the second central wavelength of the reflected signal are mismatched, thereby indicating vibration is present.

2. The system of claim 1, wherein the first and second FBG are type I fiber Bragg gratings.

3. The system of claim 1, wherein photodetector is a photodiode.

4. The system of claim 1, wherein the first central wavelength of the first FBG is tuned to a center of one of the two slopes of a second power profile of the second FBG or the second central wavelength of the second FBG is tuned to a center of one of the two slopes of a first power profile of the first FBG.

5. The system of claim 1, wherein the FBG interrogation system is multiplexed in series with another FBG interrogation system.

6. The system of claim 5, wherein the another FBG interrogation system comprises another two wavelength matching FBGs, another coupler, and another photodiode.

7. The system of claim 1, wherein the FBG interrogation system is positioned on or in an airplane wing or a wind turbine blade.

8. The system of claim 1, wherein the FBG interrogation system is positioned on or in a pipeline.

9. The method of claim 1, wherein the FBG interrogation system is positioned on or in a concrete structure for structural health monitoring.

10. The system of claim 1, wherein the FBG interrogation system measures a vibration range equal to or between 0.1 Hz to 1 GHz.

11. A method for sensing vibrations with a fiber Bragg grating (FBG) interrogator, the method comprising:
   providing an optic signal from a light source, wherein the light source is a broad band spectrum (BBS) source;
   receiving the optic signal from the light source at a first FBG, wherein the first FBG filters the optic signal and transmits a transmitted signal, and the transmitted signal has a first central wavelength in a resting state;
   receiving the transmitted signal of the first central wavelength from the first FBG at a second FBG, wherein the second FBG reflects a second central wavelength to produce a reflected signal, and the second central wavelength of the reflected signal matches the first central wavelength when the second FBG is in the resting state;
   receiving the transmitted signal from the first FBG and the reflected signal from the second FBG at an optical coupler, wherein the optical coupler is coupled to the first and second FBG;
   outputting an output signal from the optical coupler; and
   monitoring the output signal from the optical coupler with a photodetector, wherein the photodetector detects a minimum amount of energy when the first central wavelength of the transmitted signal and the second central wavelength of the reflected signal match, thereby indicating vibration is absent, and
   wherein further the photodetector detects an increased energy when the first central wavelength of the transmitted signal and the second central wavelength of the reflected signal are mismatched, thereby indicating vibration is present.

12. The method of claim 11, wherein the first FBG filter attenuates the first central wavelength in a transmission spectrum.

13. The method of claim 11, wherein the second FBG reflects the second central wavelength.

14. The method of claim 11, wherein the first and second FBG are type I fiber Bragg gratings.

15. The method of claim 11, wherein photodetector is a photodiode.

16. The method of claim 11, wherein the first central wavelength of the first FBG is tuned to a center of one of the two slopes of a second power profile of the second FBG or the second central wavelength of the second FBG is tuned to a center of one of the two slopes of a first power profile of the first FBG.

17. The method of claim 11, wherein the FBG interrogator is multiplexed in series with another FBG interrogator.

18. The method of claim 17, wherein the another FBG interrogator comprises another two wavelength matching FBGs, another coupler, and another photodiode.

19. The method of claim 11, wherein the FBG interrogator is positioned on or in an airplane wing or a wind turbine blade.

20. The method of claim 11, wherein the FBG interrogator is positioned on or in a pipeline.

21. The method of claim 11, wherein the FBG interrogator is positioned on or in a concrete structure for structural health monitoring.

22. The method of claim 11, wherein the FBG interrogator measures a vibration range equal to or between 0.1 Hz to 1 GHz.

* * * * *